J. B. KNUDSEN.
VALVE.
APPLICATION FILED MAR. 23, 1908.

932,400.

Patented Aug. 24, 1909.
2 SHEETS—SHEET 1.

Witnesses:

Inventor
J. B. Knudsen
By O. K. Tingo
Atty

J. B. KNUDSEN.
VALVE.
APPLICATION FILED MAR. 23, 1908.

932,400.

Patented Aug. 24, 1909.
2 SHEETS—SHEET 2.

Witnesses:
Inventor
J. B. Knudsen.
By
Atty.

UNITED STATES PATENT OFFICE.

JACOB B. KNUDSEN, OF CHICAGO, ILLINOIS.

VALVE.

932,400.

Specification of Letters Patent.    Patented Aug. 24, 1909.

Application filed March 23, 1908. Serial No. 422,583.

*To all whom it may concern:*

Be it known that I, JACOB B. KNUDSEN, a citizen of the United States, residing at Chicago, in the county of Cook and State of Illinois, have invented certain new and useful Improvements in Valves, of which the following is a specification.

My invention relates to improvements in valves the preferred form of which comprises: a valve body having therein a valve seat and provided in its side wall with an opening registering with said seat, a bonnet screwed into said opening and provided at its inner end with a head having a threaded central opening and an annular groove surrounding said threaded opening, a cap applied to the upper or outer end of the bonnet and having a central opening formed with a counterbore at its inner end, a gasket arranged in the counterbore in the cap, tubular union screwed to the upper end of the cap and provided at its upper end with an inwardly projecting flange, a wheel or handle seated on the union and provided on its under side with a square opening and an exteriorly threaded hub projecting through the opening in the union flange, a ring screwed on to the lower end of the hub and engaging the under side of said flange to prevent the displacement of the handle, a valve head fitting said seat and having a threaded stem rotatably arranged in the threaded opening in the head of the bonnet the upper end of the stem being square, a tubular valve stem extension having its lower end arranged in the said annular groove in the bonnet head and having an interior square opening slidably fitting the upper end of the stem and provided with an exterior annular flange engaging the under side of said gasket and having a portion fitting the opening in the cap and provided on its upper end with a square shank fitting the said square opening in the under side of the handle, a gasket surrounding the stem extension and seated on the bonnet head, a metal washer surrounding the stem extension and seated on the latter gasket, another metal washer surrounding the stem extension and engaging the under side of the said annular flange on the stem extension, and a coil spring surrounding the stem extension and having its opposite ends engaging and pressing against said metal washers.

The special object of my improvements is to provide a valve having new and improved means for preventing the escape of steam or other fluid through the bonnet of the valve.

Figure 1:
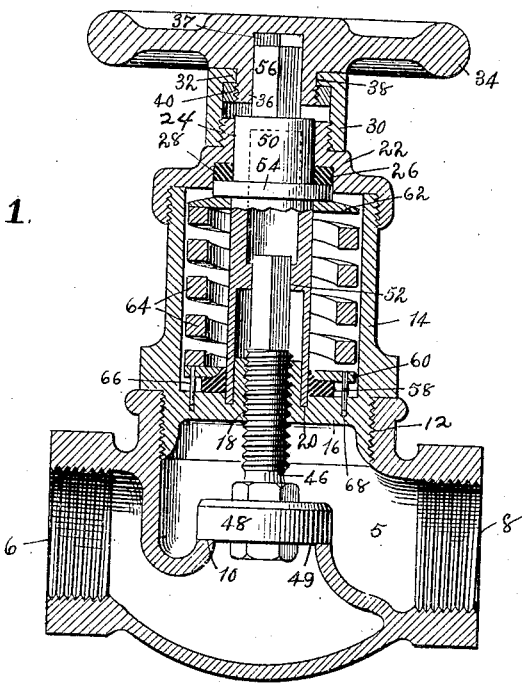
Figure 2:
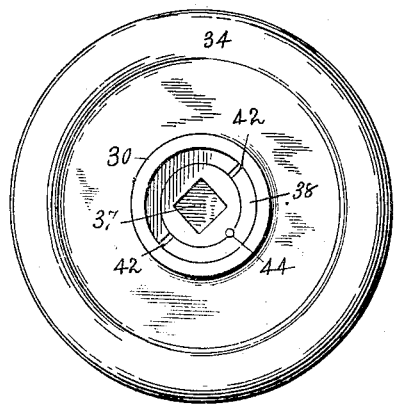
Figure 3:
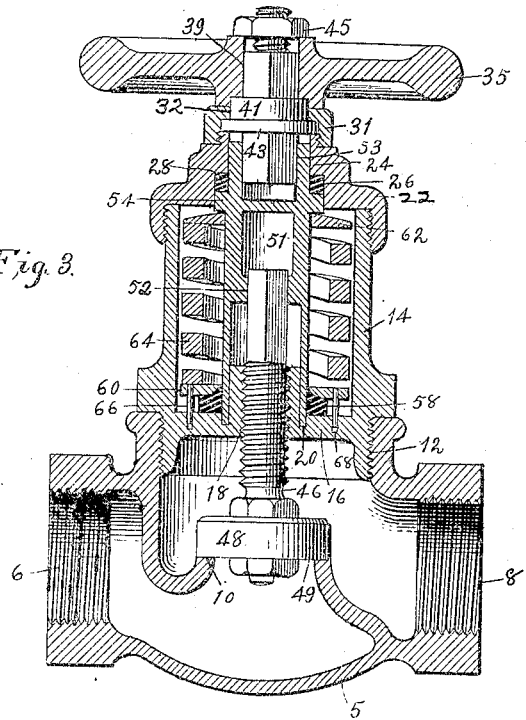

In the drawing—Figure 1 is a vertical section of my valve of preferred form; Fig. 2 a view of the under side of the handle, union and ring detached from the cap; Fig. 3 a vertical section of a valve of modified construction; and Fig. 4 a vertical fragmentary section of a valve of modified construction.

Referring to the drawing in detail—The reference numeral 5 represents the valve body having two pipe openings 6 and 8 and having therein a valve seat 10 and provided in its side with a threaded opening 12. Removably arranged in said opening 12 is a bonnet 14 provided in its lower end with a head 16 having a threaded central opening 18 and an annular groove 20 surrounding said opening 18. Screwed on the outer end of the bonnet is a cap 22 having a central opening 24 formed with an enlargement or counterbore 26 at its lower end to receive the gasket 28 made from vulcanized rubber, fiber or the like.

Screwed on the upper end of the cap is a tubular union 30 provided at its upper end with an inwardly extending flange 32. Seated on the upper end of the union is a wheel or handle 34 provided on its under side with an exteriorly threaded hub 36 arranged in and projecting through the opening 38 in the union flange 32 and having therein a vertical square opening 37. Screwed on to the lower end of the hub 36 is an interiorly threaded ring 40 engaging the under side of the flange 32 and adapted to prevent the displacement of the handle. Said ring 40 should be provided on its under side with two suitable openings or notches as 42 shown in Fig. 2 to receive the prongs of a forked wrench or key by means of which the ring may be screwed into position or removed. After screwing the ring into place it may be prevented from unscrewing by drilling a hole between the ring and hub and inserting therein a pin or screw as 44 shown in Fig. 2.

Rotatably arranged in the threaded opening 18, in the bonnet head, is a threaded valve stem 46 having its upper end squared and carrying on its opposite end a valve head 48 having a face 49 fitting said seat 10. Arranged in the bonnet is a tubular valve stem extension 50 having its lower end arranged in the groove 20 and having an interior square opening 52 slidably fitting the upper end of the stem 46 and provided with an exterior annular flange 54 engaging the under side of the gasket 28 and having a portion fitting the circular opening 24 in the cap and provided on its upper end with a square shank 56 fitting the square opening 37 in handle.

Surrounding the stem extension and seated on the bonnet head is a gasket 58 made of fiber, vulcanized rubber or the like and having its upper face curved and sloping upwardly from the outer to the inner edge as shown. Seated on the latter gasket is a metal washer 60 having its lower inner edge rounded as shown to fit the upper face of the gasket. Surrounding the stem extension and engaging the lower side of the annular flange 54 is a metal washer 62.

Arranged in the bonnet and surrounding the stem extension is a coil spring 64 having its opposite ends engaging and pressing against the said metal washers whereby the gasket 58 is pressed firmly against the bonnet head and the adjacent end of the stem extension to prevent fluid entering the bonnet, and the flange 54 pressed against the gasket 28 and the latter held firmly against the stem extension and the bottom and side wall of the counterbore 26 in such manner as to prevent fluid which may enter the bonnet from passing between the gasket 28 and the stem extension or cap.

The washer 60 may carry one or more pins 66 having their lower ends seated in openings 68 formed in the upper face of the bonnet head.

The valve just described may be closed and opened by rotating to the right and left the handle which in turn rotates the stem extension which in turn rotates the stem which when thus rotated moves endwise and slides in the opening 52 and raises and lowers the valve head.

In the modified form, shown in Fig. 3, the construction is the same as in Fig. 1 except, that the stem extension 51 has in its upper end a square opening 53 in place of the shank 56 on the stem extension 50. Second: that, the handle 35 has its central opening 39 extending through it. Third: that, the handle and stem extension are connected by a key 41 having an annular flange 43 seated on the top of the cap and having its lower end fitting the opening 53 in the stem extension and having its upper end fitting the opening 39 in the handle and carrying on its upper end a nut 45 for preventing the displacement of the handle. Fourth: that, the ring 40 is dispensed with. And fifth: that, the union 31 is shorter than the union 30 because the ring 40 is not employed.

Figure 4:
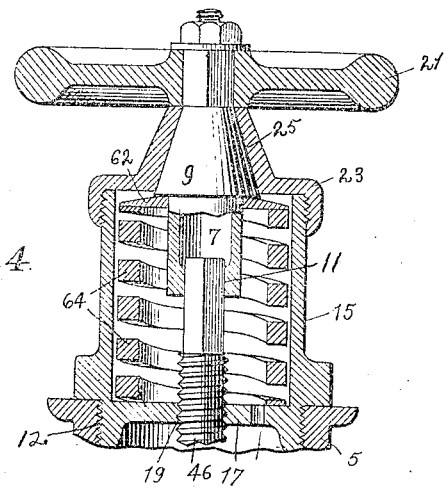

In the valve of modified construction shown in Fig. 4, 5 represents a fragment of the valve body; 15 the bonnet provided at its lower end with a head 17 having a threaded central opening 19 to receive the threaded valve stem 46; 23 a cap screwed on the upper end of the bonnet and provided with a conical central opening 25 having its upper end smallest; a valve stem extension 7 having a conical shaped portion or flange 9 fitting said conical opening 25 in the cap and having in its lower end a square opening 11 to slidably receive the square end of the stem 46 and provided on its outer end with a handle 21; 62 a metal washer surrounding the stem extension and engaging the lower end of the conical flange 9; and 64 a coil spring arranged in the bonnet and having its opposite ends pressing against the bonnet head and washer respectively whereby the steam or other fluid is prevented from passing between the cap and the conical flange.

Either of stem extension flanges and the washer 62 may be made integral or the washer dispensed with and the lower part of the flange increased in diameter to engage the spring.

I preferably use in either form of valve my cast iron spring described and claimed in Patent No. 843,827 issued Feb. 12, 1907, as this spring is not detempered by heat.

As certain changes other than those mentioned might be made in the construction shown and described without departing from the spirit of my invention I do not wish to be confined to the exact detail constructions shown or described.

What I claim, is:

1. The combination with a casing provided with an inlet and an outlet port, a valve arranged between said ports, a bonnet having threaded connection with said casing, a head for said bonnet having a central threaded opening and provided with an annular groove surrounding said opening, a valve stem engaging said opening, a squared portion on said stem extending above the bonnet head, and a cap for the bonnet, of a tubular stem extension rotatable in said annular groove and provided with a suitable opening slidably engaging the squared portion of the valve stem, an angular shank on the said stem extension, and an operating device secured to the cap and adapted to engage said shank.

2. The combination with a casing provided with an inlet and an outlet port, a valve arranged between said ports, a bonnet having threaded connection with the casing, a head for said bonnet having a central threaded opening and provided with an annular groove surrounding said opening, a valve stem engaging said opening, a squared portion on said stem extending above the bonnet head, and a cap for the bonnet of a tubular stem extension seated in said annular groove and rotatable therein, said extension having a suitable opening slidably engaging the squared portion of the valve stem, a gasket having a sloping face surrounding said extension adjacent said bonnet head, a washer having a rounded margin engaging the sloping face of said gasket, a coiled spring bearing against said washer, an angular shank on the said stem extension, and an operating device secured to the cap and adapted to engage said shank.

3. The combination with a casing provided with an inlet and an outlet port, a valve arranged between said ports, a bonnet having threaded connection with the casing, a head for said bonnet having a central threaded opening and provided with an annular groove surrounding said opening, a valve stem engaging said opening and having a squared portion extending above the bonnet head, and a cap for the bonnet, of a tubular stem extension seated in said annular groove and rotatable therein, said extension having a suitable opening slidably engaging the squared portion of the valve stem, an annular flange on the said extension, an upper washer engaging the under surface of said flange, a gasket surrounding said extension adjacent said bonnet head and provided with a sloping face, a lower washer having a rounded inner margin engaging the sloping face of said gasket, a second gasket interposed between said flange on the stem extension and the cap, a coiled spring arranged within the bonnet and having its ends bearing against said washers, an angular shank on the stem extension, and an operating device secured to the cap and adapted to engage said shank.

In testimony whereof I affix my signature in presence of two witnesses.

JACOB B. KNUDSEN.

Witnesses:
O. K. TREGO,
LILA WARTERFIELD.